US012692893B2

(12) United States Patent
Steffenfauseweh et al.

(10) Patent No.: US 12,692,893 B2
(45) Date of Patent: Jul. 28, 2026

(54) HOLLOW-CYLINDRICAL BASE ELEMENT OF A CONNECTING UNIT

(71) Applicant: BÖLLHOFF VERBINDUNGSTECHNIK GmbH, Bielefeld (DE)

(72) Inventors: Sandra Steffenfauseweh, Verl (DE); Wolfgang Hesse, Rietberg (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 1413 days.

(21) Appl. No.: 16/710,519

(22) Filed: Dec. 11, 2019

(65) Prior Publication Data

US 2020/0191190 A1        Jun. 18, 2020

(30) Foreign Application Priority Data

Dec. 13, 2018    (DE) .................... DE102018132192.9

(51) Int. Cl.
*F16B 25/00*        (2006.01)
*B60Q 1/26*        (2006.01)
(Continued)

(52) U.S. Cl.
CPC ........ *F16B 25/0042* (2013.01); *B60Q 1/2626* (2013.01); *B62J 6/04* (2013.01); (Continued)

(58) Field of Classification Search
CPC   F16B 25/0042; F16B 5/0216; F16B 25/0031; F16B 33/006; F16B 5/0225; (Continued)

(56) References Cited

U.S. PATENT DOCUMENTS 932,342 A * 8/1909 Smith ........................ F22B 7/16
                                        403/194
1,346,867 A * 7/1920 Weibull ................ F16B 35/005
                                        411/395
(Continued)

FOREIGN PATENT DOCUMENTS

AT            241748 T        6/2003
CN        101107416 A        1/2008
(Continued)

OTHER PUBLICATIONS

CN Office Action for CN Application No. 201911285735.2 dated Jan. 25, 2021 (7 pages).

*Primary Examiner* — Christine M Mills
*Assistant Examiner* — Dil K. Magar
(74) *Attorney, Agent, or Firm* — Reising Ethington P.C.

(57)        ABSTRACT

A hollow-cylindrical base element of a connecting unit for connecting a first component to a second component with a distance therebetween has an outer side, a threadless inner side, adjacent to a first axial end has a first drive feature and a first inner diameter, and adjacent to a second axial end a pivoting element with a threadless passage opening having a second inner diameter smaller than the first inner diameter. A first outer thread is provided between the first and the second axial end, wherein the first outer thread, when used in the first component, is in engagement therewith. The pivoting element is at least partially in engagement with the inner side of the base element in such a form-fitting manner that it is immovable along a longitudinal axis of the base element and is pivotable relative to the base element.

7 Claims, 9 Drawing Sheets

(51) Int. Cl.

| | |
|---|---|
| *B62J 6/04* | (2020.01) |
| *F16B 5/02* | (2006.01) |
| *F16B 33/00* | (2006.01) |

(52) U.S. Cl.
CPC ........ *F16B 5/0216* (2013.01); *F16B 25/0031* (2013.01); *F16B 33/006* (2013.01)

(58) Field of Classification Search
CPC ........ F16B 5/025; F16B 5/0283; F16B 43/02; F16B 5/0233; F16B 5/065; B60Q 1/2626; B62J 6/04
USPC .......................................... 411/383, 537, 380
See application file for complete search history.

(56) References Cited

U.S. PATENT DOCUMENTS

| | | | | |
|---|---|---|---|---|
| 1,401,683 | A * | 12/1921 | Flannery ................... | F22B 7/16 411/380 |
| 1,679,161 | A * | 7/1928 | Kindervater ......... | F16B 5/0241 280/771 |
| 3,779,157 | A * | 12/1973 | Ross, Jr. ............... | B30B 9/3053 141/73 |
| 3,866,519 | A * | 2/1975 | Miyao ................... | F01B 3/0085 91/488 |
| 4,607,992 | A * | 8/1986 | Mauritz ............... | F16B 13/066 411/537 |
| 5,205,693 | A * | 4/1993 | Fuller ..................... | F16B 21/16 411/383 |
| 5,634,755 | A * | 6/1997 | Jones, Jr. ............... | B03C 1/286 411/383 |
| 5,904,436 | A * | 5/1999 | Maughan ........... | F16C 11/0647 403/135 |
| 6,443,680 | B1 * | 9/2002 | Bodin ................ | F16B 23/0038 411/389 |
| 6,702,503 | B2 * | 3/2004 | Pinzl .................... | F16B 5/0233 403/348 |
| 6,722,052 | B2 * | 4/2004 | Wu ....................... | F16B 5/0208 411/383 |
| 6,905,298 | B1 * | 6/2005 | Haring .................. | F16B 5/025 411/432 |
| 7,101,135 | B2 * | 9/2006 | Hassed ................ | F16B 5/0216 411/432 |
| 7,658,581 | B2 | 2/2010 | Süßenbach | |
| 7,891,927 | B2 * | 2/2011 | Burger ................ | F16B 5/0233 411/908 |
| 8,337,132 | B2 * | 12/2012 | Steffenfauseweh .. | B60Q 1/0433 411/546 |
| 8,342,787 | B2 * | 1/2013 | Smith ..................... | F16B 35/02 411/383 |
| 8,944,736 | B2 | 2/2015 | Figge et al. | |
| 9,150,145 | B2 * | 10/2015 | Wandelt ............... | B60Q 1/0433 |
| 9,151,317 | B1 * | 10/2015 | Braun ................... | F16B 5/0225 |
| 10,145,506 | B2 | 12/2018 | Bullard | |
| 2004/0013495 | A1 * | 1/2004 | Hassed ................. | F16B 5/0216 411/537 |
| 2006/0280579 | A1 * | 12/2006 | Seidl ..................... | F16B 5/0233 411/546 |
| 2008/0163579 | A1 * | 7/2008 | Kreyenborg .......... | E06B 3/5436 52/474 |
| 2008/0213065 | A1 | 9/2008 | Sussenbach | |
| 2008/0247833 | A1 * | 10/2008 | Astorga Ramirez ........................ | B23Q 11/0046 408/202 |
| 2010/0073952 | A1 * | 3/2010 | Bryce .................. | B60Q 1/2626 362/549 |
| 2010/0290864 | A1 * | 11/2010 | Wang .................... | F16B 5/0208 411/383 |
| 2014/0270999 | A1 * | 9/2014 | Huang .................... | B23B 27/10 407/11 |
| 2015/0040350 | A1 * | 2/2015 | Vess ...................... | F16B 5/0225 16/225 |
| 2015/0224916 | A1 * | 8/2015 | Wandelt ................ | F16B 5/025 362/523 |
| 2015/0314805 | A1 | 11/2015 | Hoyer et al. | |
| 2016/0341235 | A1 * | 11/2016 | Heimann ................ | F16B 21/09 |
| 2017/0343023 | A1 * | 11/2017 | Schevers ................ | F16B 5/025 |
| 2019/0031083 | A1 | 1/2019 | Hübner et al. | |
| 2019/0040897 | A1 | 2/2019 | Vorderwisch | |
| 2020/0332819 | A1 | 10/2020 | Matthes et al. | |

FOREIGN PATENT DOCUMENTS

| | | | | |
|---|---|---|---|---|
| CN | 101790648 | A | 7/2010 | |
| CN | 105090260 | A | 11/2015 | |
| CN | 108087405 | A | 5/2018 | |
| DE | 3335628 | A1 * | 4/1985 | ........... F16B 13/066 |
| DE | 20105094 | U1 | 7/2001 | |
| DE | 20210411 | U1 | 10/2002 | |
| DE | 10204380 | C1 | 6/2003 | |
| DE | 10325066 | A1 * | 12/2004 | ............ B23B 47/28 |
| DE | 102004021484 | A1 * | 11/2005 | ......... F16B 25/0015 |
| DE | 202007005777 | U1 * | 7/2007 | ........... F16B 5/0216 |
| DE | 202009003796 | U1 * | 8/2009 | ............ F16B 21/09 |
| DE | 202008012502 | U1 | 10/2009 | |
| DE | 102010032749 | A1 * | 2/2012 | ........... E04B 2/885 |
| DE | 102012009173 | A1 | 11/2012 | |
| DE | 102011054861 | A1 | 5/2013 | |
| DE | 102016101634 | A1 | 8/2017 | |
| DE | 102016101910 | A1 | 8/2017 | |
| DE | 102016203141 | A1 * | 8/2017 | |
| DE | 202018104667 | U1 | 8/2018 | |
| EP | 2412883 | A1 * | 2/2012 | ........... E04B 2/885 |
| GB | 1010013 | A | 11/1965 | |
| GB | 2364109 | A | 1/2002 | |

* cited by examiner

HOLLOW-CYLINDRICAL BASE ELEMENT OF A CONNECTING UNIT

CROSS REFERENCE TO RELATED APPLICATIONS

This application claims the priority of German patent application No. 102018132192.9, filed on Dec. 13, 2018. The entire content of this priority application is incorporated herein by reference in its entirety.

TECHNICAL FIELD

The present disclosure relates to a hollow-cylindrical base element of a connecting unit for connecting a first component to a second component having a distance therebetween, a first component with the hollow-cylindrical base element, a connecting unit, a connection of a first and a second component with the connecting unit, a manufacturing method for a hollow-cylindrical base element, and a connecting method for connecting a first component to a second component having a distance therebetween.

BACKGROUND

In many fields of technology, it is often necessary to connect two components which have a distance between them. In the technical field of the automotive industry, an example of two components fastened to each other which have a distance between them is a tail light fastened to a vehicle body.

To adjust the distance between the two components, compensating connecting units are used. These solutions are usually constructed in such a manner that they can only change the distance between the components to be connected. The compensation of such a distance is often done with a connecting unit with automatic tolerance compensation. Examples for this can be found in DE 10 2012 009 173 A1 and DE 10 2011 054 861 A1.

Another connecting unit without automatic tolerance compensation, i.e. with manual tolerance compensation, which represents the state of the art within the company, is explained below. The connecting unit comprises a hollow-cylindrical base element 1, which is shown in FIG. 1. The base element 1 comprises an outer side with a first outer thread and a first drive feature adjacent to a first axial end 3 and an inner side with a first inner thread adjacent to a second axial end. A female or hollow screw 5 is provided in engagement with the first internal thread. The hollow screw 5 comprises a second drive feature. The second drive feature of the hollow screw 5 is used for assembly in the base element 1.

In use, the base element 1 is screwed into a first opening in the first component A by means of a first drive feature adjacent to the first axial end 3. The hollow screw 5 is then brought into abutment with the second component B. For fixing, a connecting screw 7 with a second outer thread is screwed into a second inner thread at or adjacent to the second component B. An adjustment of the distance between the two components A and B is then carried out by means of the first drive feature of the base element 1. FIG. 2 shows the base element 1 in installed condition. An angle cannot be compensated with this connecting unit, so that this connecting unit is not suitable if two components that are not oriented parallel to each other at the connecting points are to be connected to each other.

With regard to the above-described connecting unit with manual tolerance compensation, reference is also made to DE 10 2004 021 484 A1 for the sake of completeness. The thread element described herein and made of plastic has a specifically designed thread profile with a small profile angle between 30° and 50° and a relatively large rounding at the flank tips, wherein the free space between the windings of the thread has a larger volume than the thread. In order to create a specific cutting geometry of the thread profile, the thread element is comprised of several angle segments which are radially displaced from each other in such a manner that adjacent angle segments each form effective cutting edges in the screw-in direction.

In case an angle has to be compensated as well, e.g. due to a displacement between the connecting points of the two components and/or a non-parallel arrangement of the components to be connected at the connecting points, this is usually not realizable with the known connecting units with tolerance compensation function, and if it is, then up to now only in an unsatisfactory manner due to the very small angle range.

A connecting unit with angle compensation function from a related technical field, namely the aircraft industry, is described in GB 1,010,013. To allow an aircraft skin and a plate for an opening in the skin or any two components to be connected at a predetermined distance from each other, i.e. to arrange the plate in alignment with the skin, a bushing in a ball section of a ball joint is adjustable via a threaded connection. A nylon insert locks the bushing in the adjusted position in which it is screwed into the ball section by means of the tool engagement faces. The ball section also serves as a nut for a connecting screw with which the ball section is fastened to the plate. The ball section has a collar which can be deformed radially to lock on or at the connecting screw. Due to a protrusion and a groove co-acting therewith, the ball section cannot rotate axially in its cage and the cage has nuts with which it is secured to a frame wall of the opening. The ball section can tilt in its cage so that the connecting bolt and the threaded hole or bore of the ball section can be aligned even if the plate is curved or the connected elements are exposed to different loads. This assembly requires a certain order in which the assembly steps are carried out, so overall it is complex.

The object of the present disclosure is therefore to provide a base element in the shape of a hollow cylinder which is improved compared to the prior art, as well as a corresponding connecting unit which, in addition to tolerance compensation with regard to the distance between the components to be connected, also provides an angle compensation function, in particular a solid or space angle compensation function. The improved connecting unit can also be used with only one-sided accessibility of the components to be connected. In addition, a distance between the first and the second component should remain easily adjustable even after a screw connection has been established. Further objects of the present disclosure are the provision of a corresponding first component, a connection between two components, a manufacturing method of the hollow-cylindrical base element as well as a connecting method.

SUMMARY

The above object is solved by a hollow-cylindrical base element of a connecting unit for connecting a first component to a second component having a distance therebetween, a first component with the hollow-cylindrical base element, a connecting unit for connecting a first component to a second component having a distance therebetween, a connection of a first and a second component with the connecting unit, a manufacturing method of a hollow-cylindrical base element, as well as a connecting method of a first component with a second component having a distance therebetween. Advantageous embodiments and further developments arise from the following description, the drawings and the appending claims.

A hollow-cylindrical base element of a connecting unit for connecting a first component to a second component having a distance therebetween, comprises: an outer side and a threadless inner side; adjacent to a first axial end, a first drive feature and a first inner diameter; adjacent to a second axial end arranged opposite to the first axial end, a pivoting element with a threadless passage opening having a second inner diameter which is smaller than the first inner diameter; and, between the first axial end and the second axial end, a first outer thread which, when used in the first component, is in engagement with the latter, wherein the pivoting element is at least partially in engagement with the threadless inner side of the hollow-cylindrical base element in such a form-fitting manner that it is immovable in the axial direction along a longitudinal axis of the base element and pivotable relative to the longitudinal axis of the base element.

For a better understanding of the functionality of the hollow-cylindrical base element, this is described by means of its use in a connection between two components. First, the base element is screwed into a first opening of the first component. The rotational direction is determined by a first spiral direction of the first outer thread. The screwing-in is carried out by means of the drive feature present at the base element, which is arranged adjacent to the first axial end. The first drive feature can be an outer or inner drive feature. For example, the first drive feature is an outer hexagon arranged for example at the radial outer side of a flange adjacent to the first axial end. Alternatively, there may also be an outer hexagon without a flange. Likewise, an internal drive feature may be used, such as an inner hexagon, so that, for example, a tool such as an Allen key can engage therein.

After the base element has been screwed into the first opening in the first component, for example until the flange abuts at one side of the first component, the second component with a second opening is aligned with the first component. The arrangement of the two components is such that the first axial end of the base element is arranged adjacent to the first component, while the second axial end with the pivoting element is arranged adjacent to the second component. In particular the pivoting element provides an abutment face for the second component.

To explain the basic functionality, it may be assumed that the first opening of the first component and the second opening of the second component are aligned with each other and that the respective connecting points or connecting places extend in a parallel manner. Consequently, it is sufficient to insert a connecting screw into the base element from the first axial end of the base element so that the longitudinal axis of the connecting screw extends along the longitudinal axis of the base element, i.e. the two longitudinal axes are congruent. Here, an outer diameter of a head of the connecting screw is smaller than the first inner diameter of the base element and an outer diameter of a shaft of the connecting screw having a second outer thread is smaller than the second inner diameter of the passage opening in the pivoting element. Thus, the head of the connecting screw is arranged in the base element, while the shaft of the connecting screw extends through the passage opening in the pivoting element and into the opening in the second component. In particular, the head of the connecting screw abuts at the pivoting element.

In case the side of the second component facing away from the first component is accessible, a fastening nut can be screwed onto the connecting screw. The rotational direction is determined by a second thread direction or spiral direction of the second outer thread of the connecting screw. If the base element is to be used with only one-sided accessibility, i.e. the side of the second component facing away from the first component is not accessible, then the inner thread matching the second outer thread must be provided at or adjacent to the second component, e.g. by a welded-on nut or similar. The second spiral direction of the second outer thread of the connecting screw and the first spiral direction of the first outer thread of the base element may be identical.

A first advantage of at least some implementations of the base element is described in the following. First, the pivoting element is non-detachably connected to the base element along the longitudinal axis. This results from the feature that it at least partially engages with the threadless inner side of the base element in such a form-fitting manner that it is immovable in the axial direction along the longitudinal axis of the base element. For this purpose, the pivoting element is circumferentially completely surrounded by the base element according to a first alternative. In a second alternative, the base element comprises a radial cutout or clearance adjacent to the second axial end. This is dimensioned such that the pivoting element can be clipped in laterally relative to the longitudinal axis of the base element to ensure the above functionality. A manual adjustment of the distance between the first and the second component is therefore carried out solely by screwing the base element into or out of the first component. This simplifies the adjustment possibilities and thus the handling.

Furthermore, because of the pivoting element, an adjusting of the distance between the first and the second component can take place even after the connecting screw has been tightened. In particular, the base element can be screwed further into or out of the first component by means of the first drive feature, without the connecting screw loosening from the engagement with the inner thread in or adjacent to the second component. This is another advantage.

Due to the dimensioning of the outer diameter in the shaft area of the connecting screw and the second inner diameter in the area of the passage opening of the pivoting element, a radial displacement of the opening in the first component to the opening in the second component can also be compensated when the two components are arranged in parallel in the area of the connecting points. In other words, there is a radial distance or a radial tolerance between the shaft of the connecting screw and the second inner diameter of the passage opening. This is emphasized by the feature that the passage opening is threadless. The shaft of the connecting screw therefore extends through the passage opening without being in engagement therewith, in particular the second outer thread of the connecting screw is not in threaded engagement with the passage opening.

A further advantage of at least some implementations of the connecting unit becomes clear when the connecting points or connecting places of the first and the second component are not aligned parallel to each other. Due to the above described possibility of pivoting or tilting the longitudinal axis of the connecting screws relative to the longitudinal axis of the base element, namely in any spatial direction, the longitudinal axis of the connecting screw and thus also the passage opening of the pivoting element are aligned with the second opening in the second component in this case. Then the second component is fixed in the usual manner by means of the connecting screw.

Due to the specific design of the base element inside, the two components are not fastened to each other in a tensioned state, in contrast to the known prior art. The loads acting on the components due to the connection are thus reduced in comparison to the known base elements. This is a further advantage of the present disclosure.

Referring to a tail light as an example for the first component, it is usually fastened at three points to the vehicle body as a second component. At one point, fastening is carried out with a connecting unit with manual tolerance compensation, which can only compensate the distance. For example, the base element shown in FIGS. 1 and 2 is thus used. In the remaining two points, the base element is used. In this way it is avoided that the tail light is under tension due to the tolerances to be compensated and that the outer thread of one or all of the base elements overlatches and becomes non-functional.

In a further embodiment of the hollow-cylindrical base element, the pivoting element may comprise a ball segment section and the base element comprises a connecting section adapted to the ball segment section so that the pivoting element engages at least partially in a form-fitting manner with the threadless inner side of the hollow-cylindrical base element. In particular due to the ball segment section and the connecting section adapted thereto, the advantage of the angle compensation function shown above can be achieved. The dimensioning at that depends on the components to be connected as well as on the solid or space angle to be compensated.

The first outer thread of the hollow-cylindrical base element may be formed in a self-cutting or self-tapping manner. This is particularly advantageous if the base element is made of plastic and is to be screwed into a first component made of plastic. An example of a plastic of which the base element is made of is PPA-GF50. Correspondingly designed threads are known and are described for example in DE 10 2016 101 910 A1 or DE 10 2004 021 484 A1, to which reference is made in this respect. An advantage of this design is that the opening in the first component does not have to be provided with a thread, which reduces the amount of work required.

In a further embodiment of the hollow-cylindrical base element, it has a flange at the first axial end. On the one hand, the flange ensures that the base element cannot be screwed too far into the first component because, when the base element is screwed in, the flange abuts at the side of the first component adjacent to the first opening and prevents a further screwing-in. Furthermore, the flange may comprise the first drive feature, such as the above-mentioned outer hexagon or another outer drive feature.

Furthermore, the hollow-cylindrical base element may comprise a circumferential groove adjacent to the second axial end for fastening a securing disc. The securing disc is placed on the base element after screwing the base element into the first component. In this way, the securing disc provides a safety feature in particular against unintentional unscrewing of the base element from the first component. This is useful during the adjustment process. In addition, it is particularly useful when transporting the base element in the first component to another processing location. Alternatively, and in combination with a self-cuttingly or self-tappingly formed outer thread, securing during transport is achieved by a self-securing of the outer thread.

The base element may be made of a first plastic and the pivoting element is made of a second plastic or metal. With the design of the pivoting element made of metal, a particularly stable connection to the second component is establishable. When designing the pivoting element of plastic, it must be ensured that the second plastic has a higher melting point than the first plastic for the base element. This is particularly important during manufacturing, as the pivoting element is overmolded with the material of the base element, which is explained below. In the above example, where the first plastic was PPA-GF50, the second plastic is PEEK.

It additionally may be preferred that the surface of a pivoting element made of metal, in particular the ball segment section, is coated with a lubricant in order to achieve a particular ease of movement. If both the pivoting element and the base element are made of plastic, as described above, the plastic of the base element may contain an additive such as PTFE in order to increase the sliding properties of the pivoting element in the base element. The use of an additive such as PTFE in the material of the base element may also be preferred for a pivoting element made of metal.

In a further embodiment of the hollow-cylindrical base element, the pivoting element may be pivotable by a solid or space angle of at least 2°, or at least 3° or by at least 4° with respect to the longitudinal axis of the base element. In this way, the angle tolerances that usually occur when fastening tail lights, for example, can be compensated.

It may be preferred that the pivoting element also may comprise a cylindrical section arranged at the ball segment section facing away from the first axial end. In use, the cylindrical section therefore abuts at the second component so that it provides a corresponding contact face. This is particularly advantageous in view of the fact that the ball segment section of the pivoting element is arranged in the base element and the compensation of the solid or space angle can thus be realized in combination with the cylindrical section.

In a further embodiment, the pivoting element can be rotated 360° relative to the base element. This underlines the above-described functionality that the distance between the two components can be adjusted even after fixing the connecting screw without adversely affecting the fixing of the connecting screw.

A first component comprises a hollow-cylindrical base element which is screwed into it. Therefore, the first component offers all the advantages of the base element. In order to avoid repetitions, reference is therefore made to the above description of the base element.

A connecting unit for connecting a first component to a second component with a distance therebetween comprises: a hollow-cylindrical base element as well as a connecting screw having a head, a shaft as well as a second outer thread provided at the shaft, which, in use, is in engagement with a second inner thread at or adjacent to the second component, wherein the first inner diameter is larger than an outer diameter of the head of the connecting screw and the second inner diameter is larger than an outer diameter of the shaft of the connecting screw, such that the head of the connecting screw is arrangeable in the base element and the shaft of the connecting screw extends through the passage opening. Since the base element has already been described in connection with the use of a connection between two components, it is also referred to the above explanations in this regard. The technical effects and advantages resulting for the connecting unit correspond to those for the hollow-cylindrical base element.

A connection of a first and a second component comprises a base element of the connecting unit screwed into the first component and the second outer thread of the connecting screw is in engagement with a second inner thread at or adjacent to the second component. As already described above, by means of the base element used in the connecting unit, a connection may be establishable between two components. At this, not only the distance between the two components is compensatable, but also a solid or space angle is compensatable. With regard to the details, reference is again made to the above explanations.

A manufacturing method for a hollow-cylindrical base element comprises the steps: providing a pivoting element as well as a casting mold for the base element having a shape complementary to the base element, and either arranging the pivoting element in the casting mold, casting a material for the base element into the casting mold, and curing and demolding the base element with the pivoting element at least partially molded therein, or casting a material for the base element into the casting mold, wherein the base element has a radial cutout or clearance adjacent to the second axial end, curing and demolding the base element, and clipping the pivoting element into the demolded base element.

In a further embodiment of the manufacturing method, the material of the base element is a first plastic and the pivoting element is made of a second plastic or metal. Examples of materials are PPA-GF50 for the first plastic and PEEK for the second plastic. The reason for this is that PEEK has a higher melting point compared to PPA-GF50. In general, any material combination in which the second plastic has a higher melting point compared to the first plastic is therefore suitable. In addition, the use of a lubricant with a pivoting element of metal and/or a corresponding additive in the plastic for the first component is advantageous, as explained above. This ensures the ease of rotation of the pivoting element in the base element and thus the correct functionality.

A connecting method of a first component to a second component with a distance therebetween by means of the connecting unit comprises the following steps: screwing the base element of the connecting unit into a first opening in the first component, inserting the connecting screw into the base element such that the head of the connecting screw is arranged in the base element and the shaft of the connecting screw extends through the passage opening, and screwing the connecting screw into an inner thread at or adjacent to the second component. The steps of the connecting method have already been explained above within the context of the use of the base element, so that reference is made to these explanations. This also applies with regard to the resulting technical effects and advantages.

In a further embodiment of the connecting method, wherein the base element has a circumferential groove adjacent to the second axial end, the connecting method comprises the further step: arranging a securing disc in the groove after the step of screwing-in the base element such that the base element is secured against unintentional loosening from the first component. The securing disc is placed on the base element after screwing the base element into the first component. In this way, the securing disc provides a safety device or protection, in particular against unintentional unscrewing of the base element from the first component.

It may also be preferred that the connecting method comprises the further step: adjusting a distance between the first and the second component by rotating the base element after the step of screwing-in the connecting screw. In this way, the specific technical function of the base element is evident, which allows an adjustment of the distance between the two components after fixing the connecting screw without having to loose and retighten the connecting screw.

BRIEF DESCRIPTION OF THE DRAWINGS

In the following, the present disclosure is described in detail with reference to the drawings. Identical reference signs in the drawings designate identical components and/or elements. Showing.

DETAILED DESCRIPTION

In the following, embodiments of a hollow-cylindrical base element 10 are described in detail. The base element 10 is distinguished in particular by the fact that it is axially adjustable as well as that it offers a radial compensation possibility, i.e. a desired distance between two components A, B is manually adjustable by means of the base element 10. In addition, the base element 10 ensures that the components A, B are not connected to each other under tension, even at a non-parallel and/or displaced arrangement of the connecting points or connecting places of the two components A, B to be connected.

The base element 10 can therefore be used wherever two components A, B have to be connected with a distance therebetween and an angle between the connecting points or connecting places may have to be compensated, i.e. where the connecting points or connecting places are not aligned parallel to each other. An example of this is the fastening of lights, in particular tail lights, to the vehicle body of a motor vehicle.

Referring to FIGS. 3 to 12, the hollow-cylindrical base element 10 comprises a first axial end 12 and a second axial end 14 which define a longitudinal axis of the base element 10. A first drive feature is provided adjacent to the first axial end 12. The first drive feature may be an inner and/or outer drive feature. In the exemplary embodiment shown, the base element 10 comprises a flange at the first axial end 12, which provides an outer hexagon on the radial outer side as the outer drive feature and an inner hexagon on the radial inner side as the inner drive feature. Thus, the base element 10 is screwable into the first component A by means of a wrench or the like as well as by means of an Allen key or the like.

Figure 1:
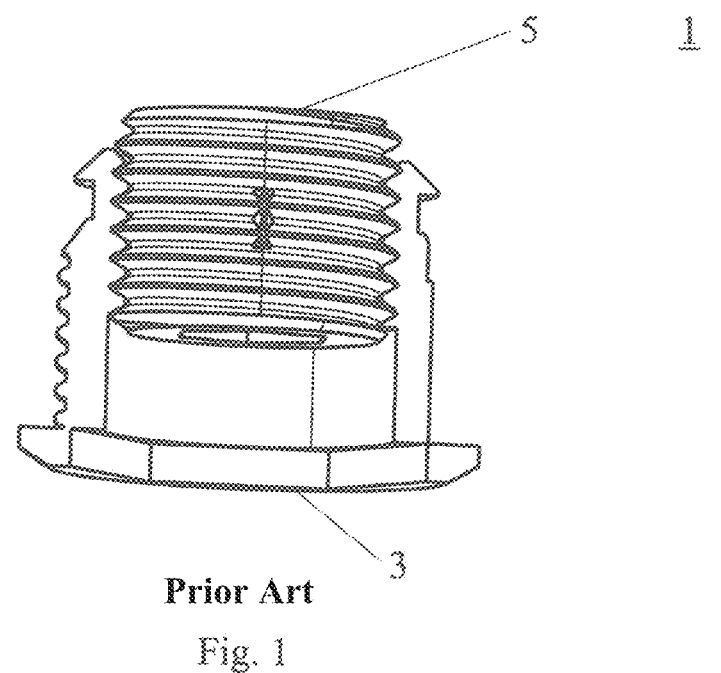
FIG. 1 a perspective view of a hollow-cylindrical base element according to the company's internal prior art with a partial section through the base element, FIG. 2 a perspective view of the hollow-cylindrical base element of FIG. 1 during use, FIG. 3 a first perspective view of a hollow-cylindrical base element with partial section through the base element, FIG. 4 a second perspective view of the hollow-cylindrical base element from FIG. 3 with a pivoted pivoting element, FIG. 5 a perspective view of the hollow-cylindrical base element of FIG. 4, FIG. 6 a plan view of the hollow-cylindrical base element according to FIG. 3, FIG. 7 a view of the hollow-cylindrical base element according to FIG. 3 from below, FIG. 8 a view of the hollow-cylindrical base element according to FIG. 3 in which the right side is shown in section, FIG. 9 a sectional view of the hollow-cylindrical base element of FIG. 3 with a pivoted pivoting element, FIG. 10 a perspective view of a securing disc, FIG. 11 a first sectional view of a connection of a first and a second component with the base element according to FIG. 3, wherein the first and the second component are arranged parallel to each other, FIG. 12 a second sectional view of a connection of a first and a second component with the base element according to FIG. 3, wherein the first and the second component are not arranged parallel to each other, FIG. 13 a schematic process sequence of an embodiment of a manufacturing method, FIG. 14 a schematic process sequence of an embodiment of a connecting method, FIG. 15 a first perspective view of a hollow-cylindrical base element according to a second embodiment, FIG. 16 a second perspective view of the hollow-cylindrical base element according to the second embodiment, FIG. 17 a first sectional view of the base element according to FIG. 15, FIG. 18 a second sectional view of the base element according to FIG. 15, and FIG. 19 a schematic process sequence of an embodiment of a manufacturing method for the base element according to FIG. 15.
Figure 2:
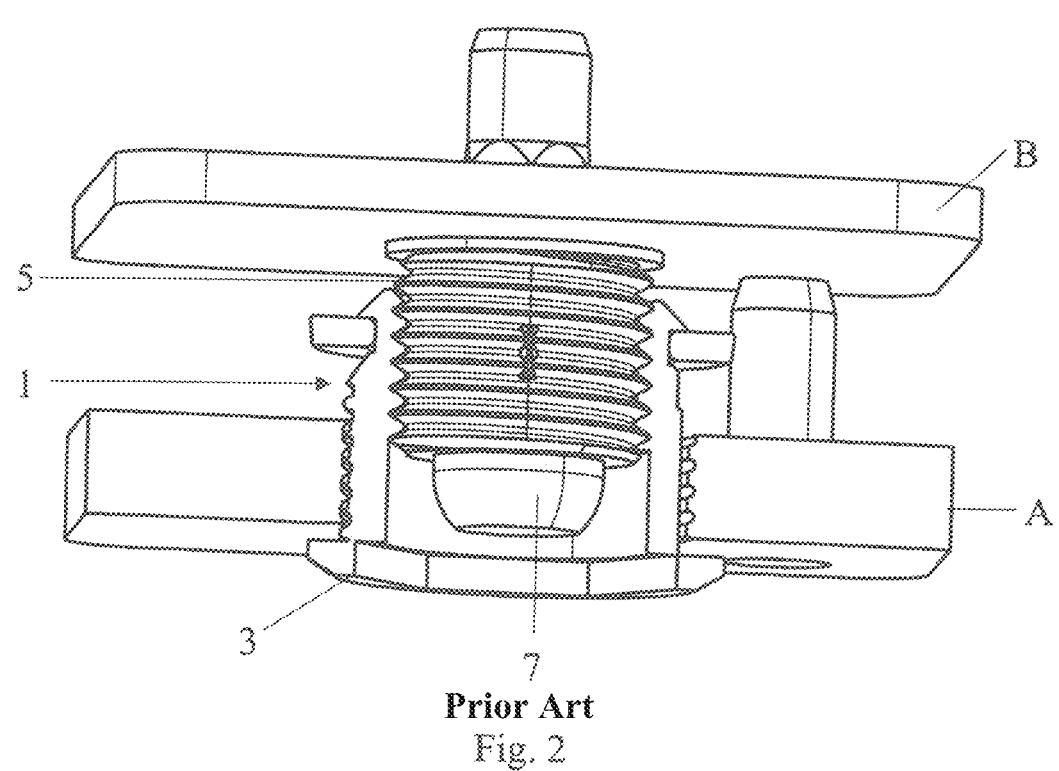
Figure 3:
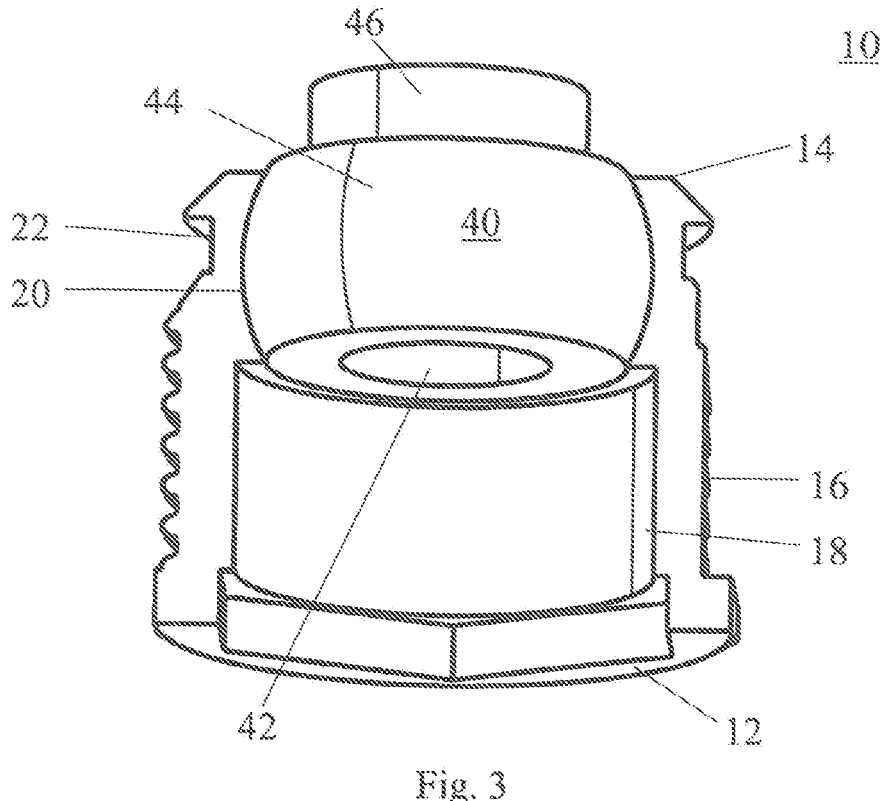

In the following, the design of the radial outer side of the base element 10 is first discussed with reference to FIGS. 3, 4 and 5. Along the longitudinal axis of the base element 10, the first drive feature adjacent to the first axial end 12 is followed by a first outer thread 16, which is in or upon use with the first component A in engagement therewith. The first outer thread 16 is formed in a self-cutting or self-tapping manner, see FIG. 5. This is particularly useful with regard to a first component A made of plastic, since the opening in the first component A does not have to comprise an inner thread. This therefore simplifies the manufacturing process. Regarding the design of self-cutting or self-tapping threads, reference is made, for example, to DE 10 2016 101 910 A1 or DE 10 2004 021 484 A1, which describe correspondingly designed threads.

Along the longitudinal axis of the base element 10 in the direction of the second axial end 14, a circumferential groove 22 is also provided for fastening a securing disc 50. The groove is thus arranged adjacent to the second axial end 14. In use, after the base element 10 has been screwed into the first opening in the first component A, the securing disc 50 is arranged in the groove 22 so that it serves for securing against unintentional unscrewing of the base element 10 from the first component A. The securing disc 50 can also act as a transport safety or protection if the first component A with the base element 10 already screwed into it is to be transported to another processing location.

Now, the design of the base element 10 in the interior is explained with reference to FIGS. 3, 4 and 6 to 9. As already discussed above, the base element 10 also has an inner drive feature, namely the inner hexagon adjacent to the first axial end 12. Along the longitudinal axis of the base element 10 a threadless inner side 18 is following, which extends up to the second axial end 14. At that, the threadless inner side 18 comprises at least two sections.

In a first section adjacent to the first axial end 12, the hollow-cylindrical base element 10 comprises a first inner diameter. At that, the first inner drive feature transitions with a step into this round threadless section with the first inner diameter. The section with the first inner diameter transitions via a further step into a connecting section 20, which terminates with the second axial end 14.

In the area or portion of the connecting section 20, i.e. adjacent to the second axial end 14, a pivoting element 40 with a threadless passage opening 42 is provided. The pivoting element 40 comprises a ball segment section 44 as well as a cylindrical section 46. The cylindrical section 46 is arranged at the ball segment section 44 facing away from the first axial end 12 and, when in use, provides an abutment face for the second component B, which will be discussed later.

The threadless passage opening 42 comprises a second inner diameter which is smaller than the first inner diameter, i.e. the inner diameter in the first threadless section adjacent to the first axial end 12 of the base element 10. The passage opening 42 extends with an unchanged diameter through both the ball segment section 44 and the cylindrical section 46.

To provide a form-fitting connection between the pivoting element 40 and the base element 10, the connecting section 20 comprises a configuration adapted to the ball segment section 44 of the pivoting element 40. In this way, the pivoting element is immovable in the axial direction along the longitudinal axis of the base element 10. This means that the pivoting element cannot be released from the base element 10 without destroying the base element 10.

Figure 4:
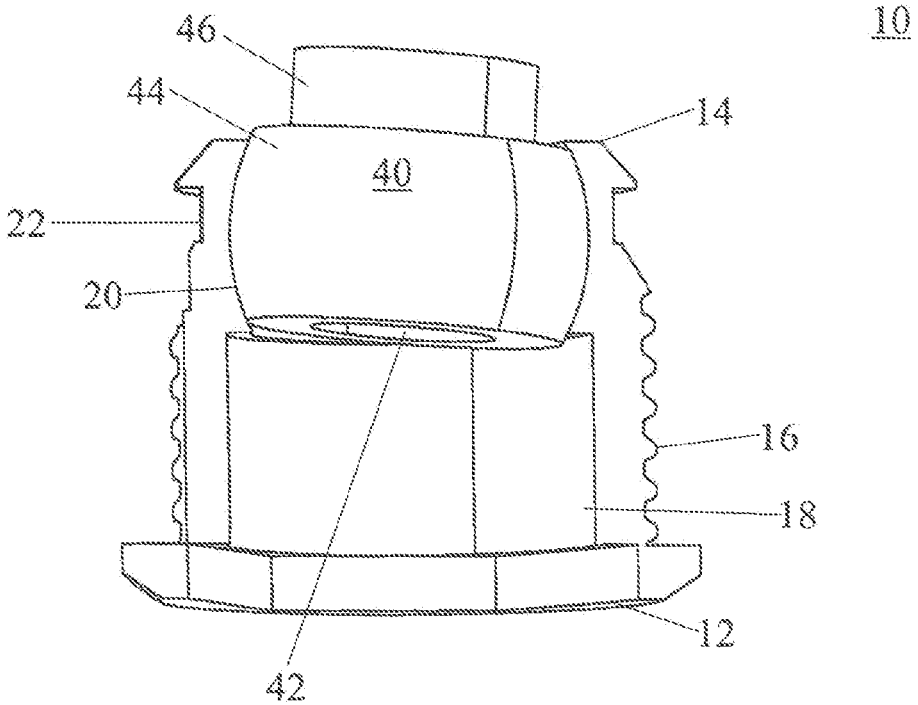
Figure 5:
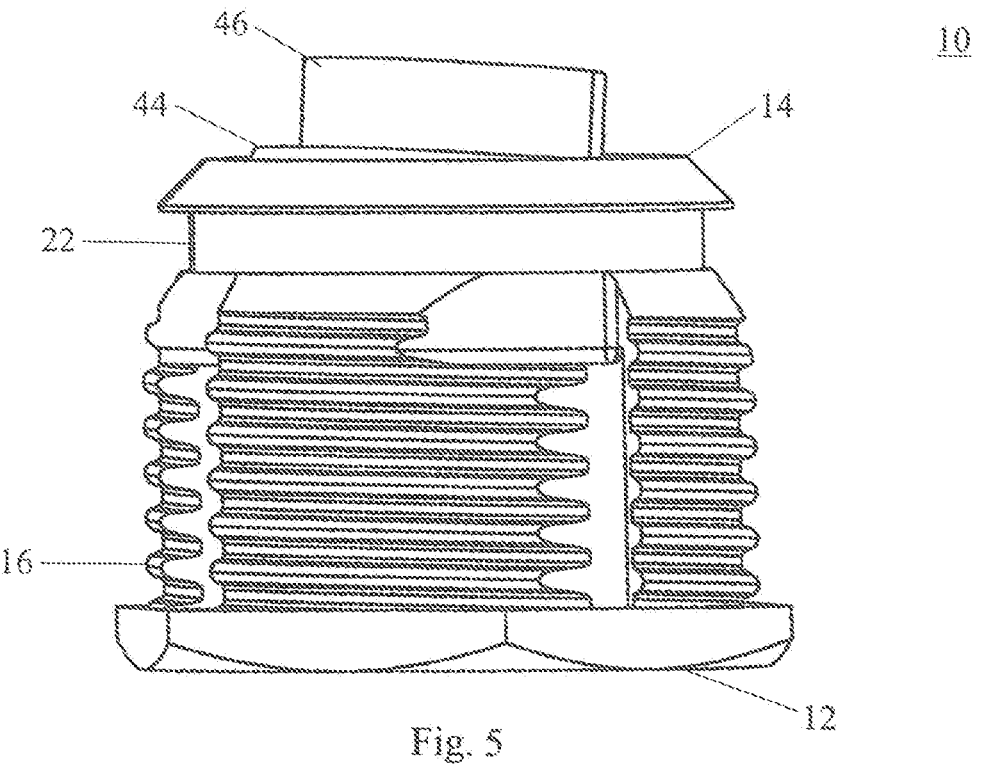
Figure 6:
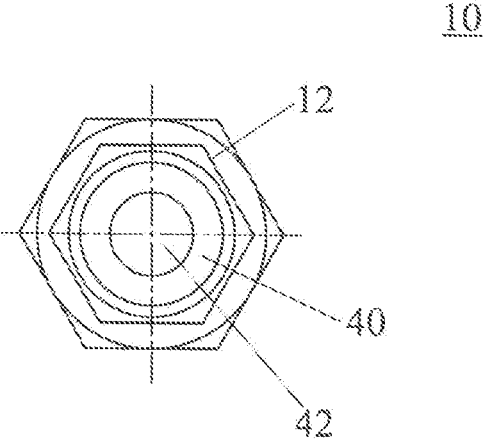
Figure 7:
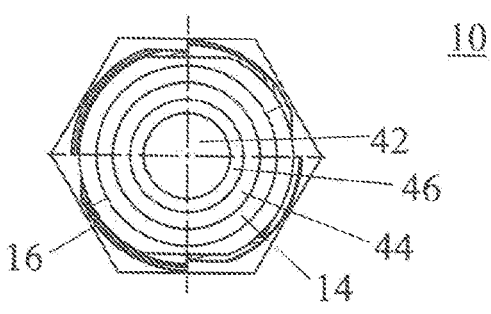
Figure 8:
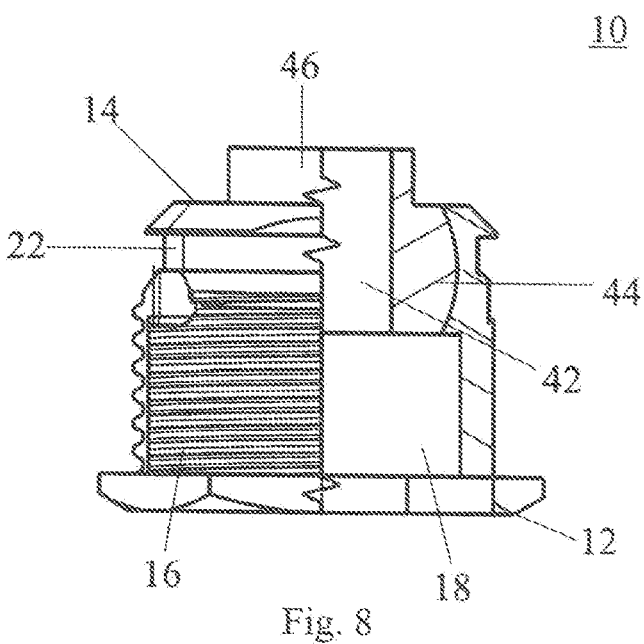
Figure 9:
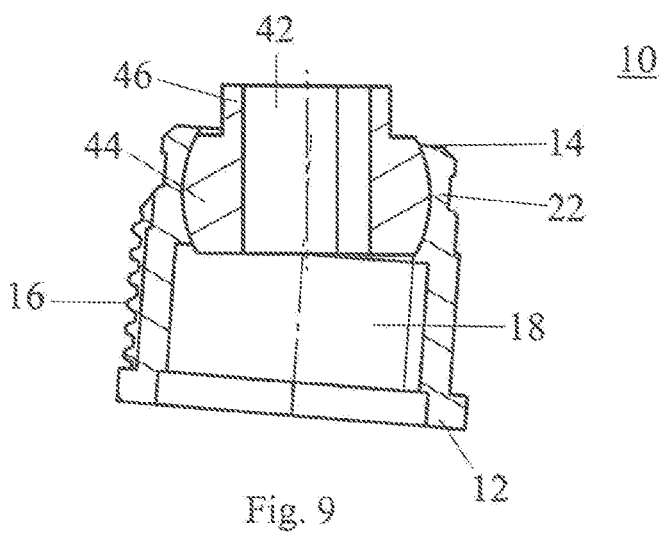

Furthermore, and as can be seen particularly in FIGS. 4, 5 and 9, by this design, the pivoting element 40 is pivotable relative to the longitudinal axis of the base element 10. The pivotability may be present in a solid or space angle of at least 2°, or at least 3° or at least 4° with respect to the longitudinal axis of the base element 10. These are the solid or space angles which are usually to be compensated if a tail light is to be fastened to a vehicle body of a motor vehicle. In this way, the application area or field is selected to be particularly advantageous. Depending on the dimensioning and design of the base element 10 and the pivoting element 40, larger angle ranges can also be realized.

In addition, because of this special form-fitting connection, the pivoting element 40 may be arranged in the base element 10 so that it can rotate about its longitudinal axis. In particular, the pivoting element 40 can be rotated by 360° in the base element 10. The advantage of this construction will become clear later in the explanation of the connecting method.

Figure 13:
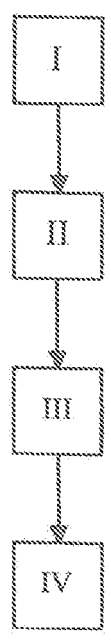

The base element 10 may be made of a first plastic and the pivoting element 40 is made of a second plastic or metal. If the pivoting element 40 is made of metal, a particularly tight screw connection between the first A and second component B can be realized. If the pivoting element 40 is made of plastic, the plastic for the pivoting element 40 must have a higher melting temperature than the plastic for the base element 10. For clarification, the manufacturing method of the base element 10 is explained below with reference to FIG. 13.

In a first step I, a providing of a pivoting element 40 and a casting mold for the base element 10 having a shape complementary to the base element 10 takes place. In a subsequent second step II, the pivoting element 40 is arranged in the mold. Casting a material for the base element 10 into the casting mold takes place in step III and in step IV a curing and demolding of the base element 10 with the pivoting element 40 at least partially molded therein takes place.

As explained above, the material of the base element 10 is in particular a first plastic and the pivoting element 40 is made of a second plastic or metal. If the pivoting element 40 is made of metal, the surface of the pivoting element 40, in particular the ball segment section 44, may be coated with a lubricant in order to achieve a particular ease of movement when the pivoting element moves relative to the base element 10.

For example, PPA-GF50 can be used as the material for the base element 10. If the pivoting element 40 is also to be made of plastic, then PEEK can be used. PEEK has a higher melting temperature compared to PPA-GF50, which is necessary due to recasting or overmolding with the material of the base element 10. Therefore, the second plastic for the pivoting element 40 must inevitably have a higher melting temperature than the first plastic for the base element 10 in order to be able to realize the desired structure.

In addition, it may be preferred that the pivoting element 40 is coated with a lubricant, in particular in the area of the ball segment section 44, in order to ensure a corresponding ease of movement later during a relative movement with respect to the base element 10. If both the pivoting element 40 and the base element 10 are made of plastic, as described above, the plastic of the base element 10 may comprise an additive such as PTFE in order to increase the sliding properties of the pivoting element 40 in the base element 10. The use of an additive such as PTFE in the material of the base element 10 may also be preferred for a pivoting element 40 made of metal.

Figure 11:
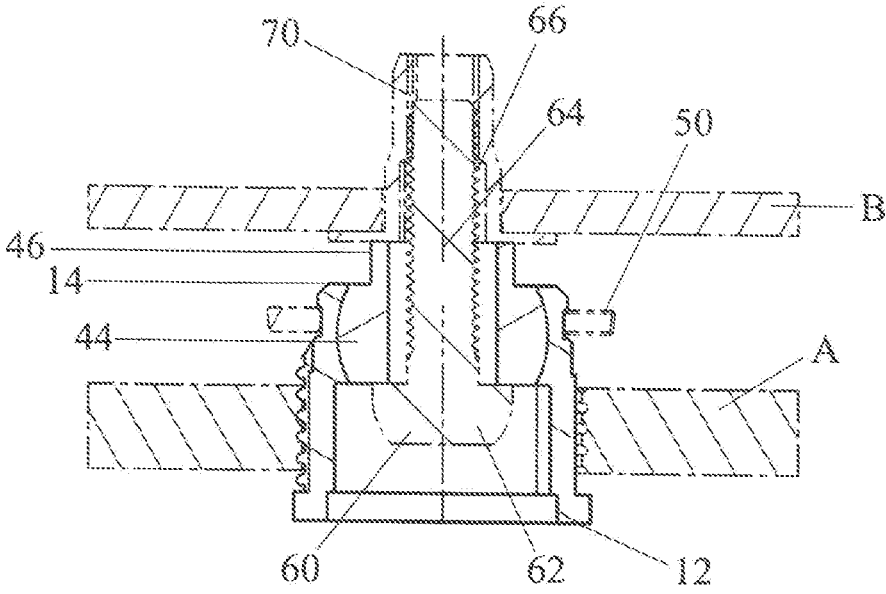
Figure 14:
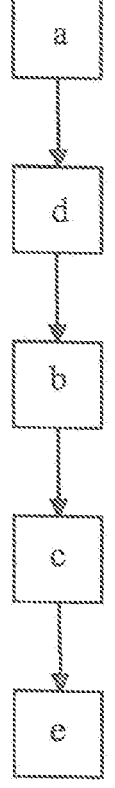
Figure 15:
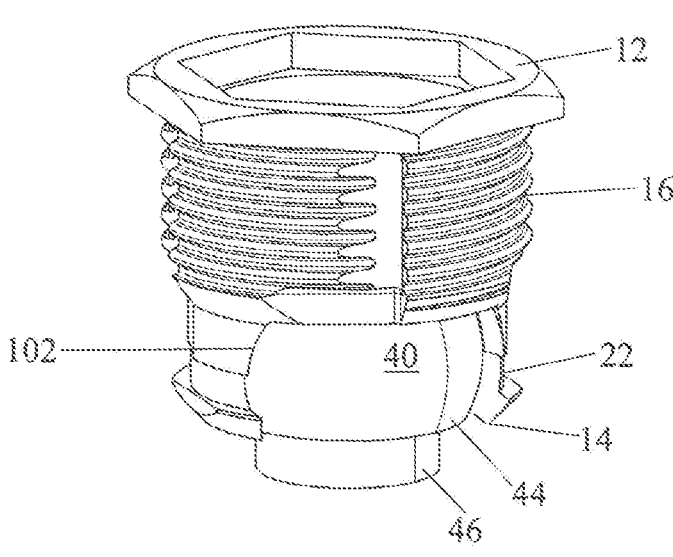
Figure 16:
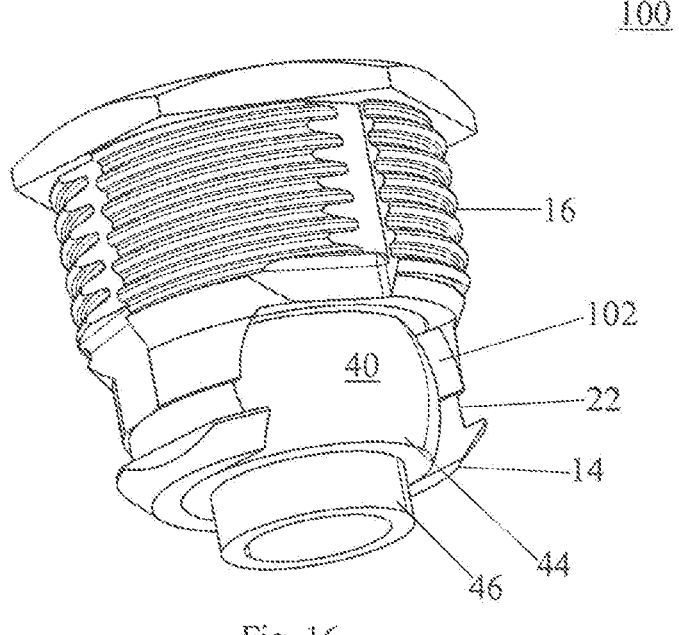

Now with reference to FIG. 11 and the sequence of a connecting method according to FIG. 14, the use of the base element 10 is described. In the example according to FIG. 11, the two components A, B are arranged parallel to each other at the connecting points. In this way, the basic understanding of the functionality of the base element 10 shall first be improved.

First, a screwing of the base element 10 into a first opening in the first component A takes place in step a. Since the first outer thread of the base element 10 is formed self-tappingly or self-cuttingly, the first component A is made of plastic and the first opening is threadless at the beginning. The screwing-in may be performed by means of the first drive feature, i.e. the inner or outer hexagon in this example and until the flange at the first axial end 12 abuts on one side of the first component A.

Figure 10:

In step d, the securing disc 50 shown in FIG. 10 is now arranged in the groove 22. In this way, the base element 10 is secured against unintentional loosening from the first component A, i.e. the securing disc 50 provides a securing or protection against an unscrewing of the base element 10 from the first component A. This is particularly advantageous when adjusting the distance between the two components A and B, as the base element 10 cannot be screwed out of component A by mistake. The use of the securing disc 50 can also be advantageous if the first component A with the base element 10 has to be transported to another processing location. Alternatively, a securing of the base element 10 in the first component A is carried out during transport due to the preferred self-tapping or self-cutting outer thread.

At the processing location, the second component B with the second opening is arranged adjacent to the first component A. In step b, a connecting screw 60 is inserted into the base element 10 and the passage opening 42 to fasten the two components A and B to each other. The connecting screw comprises a head 62 and a shaft 64 as well as a second outer thread 66 provided at the shaft 64. The first inner diameter of the base element 10 is larger than an outer diameter of the head 62. In this way, the head 62 can be arranged in the base element 60 as well as in abutment with the pivoting element 40. The second inner diameter in the area of the passage opening 42 is larger than an outer diameter of the shaft 64 of the connecting screw 60. Therefore, the shaft 64 can be inserted through the passage opening 42 without being in engagement with it. Due to the radial distance present between the shaft 64 of the connecting screw 60 and the passage opening 42, even at a parallel arrangement of the first A and the second component B a lateral displacement between the openings in the two components A and B can be compensated.

In the shown embodiment an only one-sided accessibility of the components A, B to be connected is assumed. Therefore, an inner thread 70 matching the second outer thread 66 of the connecting screw 60 is provided at or adjacent to the second component B, for example by means of a weld nut arranged at it. A screwing of the connecting screw 60 into this inner thread 70 at or adjacent to the second component B is carried out in step c. The screwing-in takes place until the head 62 of the connecting screw 60 abuts at the pivoting element 40.

Finally, in step e, an adjusting of a distance between the first A and the second component B is performed by rotating the base element 10 after the step of screwing-in the connecting screw 60. Due to the specific design of the pivoting element 40 and the base element 10, here it is not necessary to loosen the connecting screw 60. Instead, the base element 10 rotates relative to the pivoting element 40 so that the screw connection by means of the connecting screw 60 remains in place. Accordingly, the pivoting element 40 is rotatable by 360° relative to the base element 10.

Figure 12:
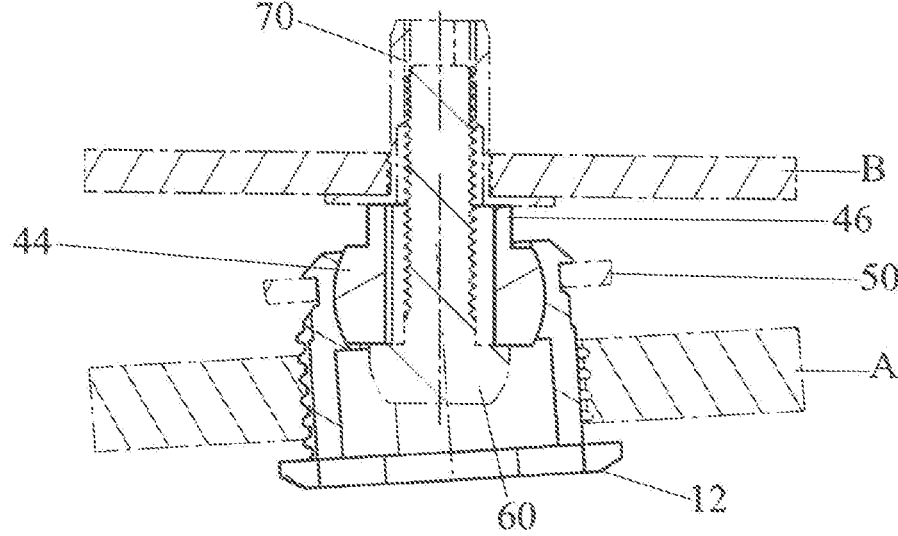

In order to illustrate a further advantage of the base element 10, FIG. 12 shows an example in which the two components A and B are not arranged parallel to each other, so that a solid or space angle has to be compensated as well. The above descriptions for a parallel arrangement apply analogously, so that in this case as well, for example, a lateral displacement between the openings in the two components A and B can be compensated due to the radial distance between the shaft 64 of the connecting screw 60 and the passage opening 42. As can be seen here, the longitudinal axis of the connecting screw 60 is pivoted relative to the longitudinal axis of the base element 10. The longitudinal axis of the connecting screw 60, however, corresponds to the longitudinal axis of the pivoting element 40. The pivoting element 40 thus continues to abut at the second component B with its cylindrical section 46 and the base element 10 is fastened in the first component A.

In case a distance between the two components A, B has to be changed, the base element 10 can now easily be screwed further into the first component A or further out of the first component A by means of the first drive feature in the base element 10. The screwing of the base element 10 does not influence the fastening of the connecting screw 60 in the second component B. Thus, in this example, the base element 10 also ensures a tension-free fastening of the first component A to the second component B.

FIGS. 15 to 18 show a further embodiment of a base element 100. Compared to the embodiment of the base element 10 discussed above, the base element 100 comprises a radial cutout or clearance 102 adjacent to the second axial end 14. In this way, the longitudinal axis of the base element 100 encloses an angle of 90° with an assembly and disassembly direction of the pivoting element 40.

Figure 17:
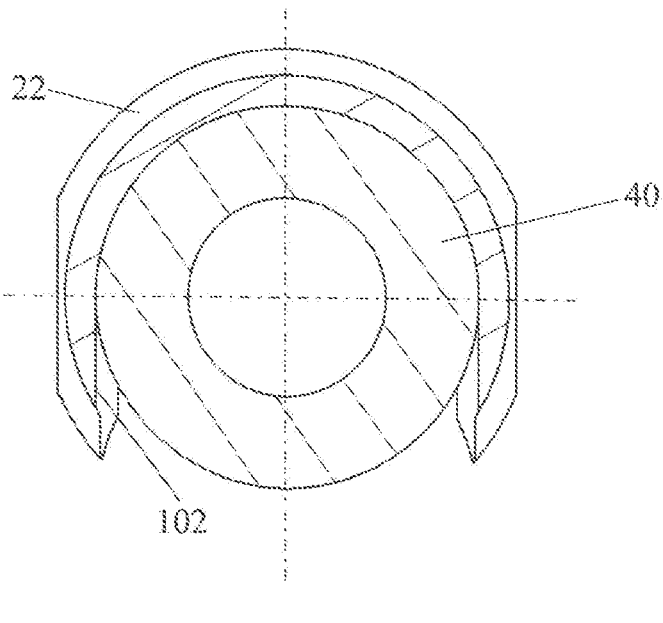
Figure 18:
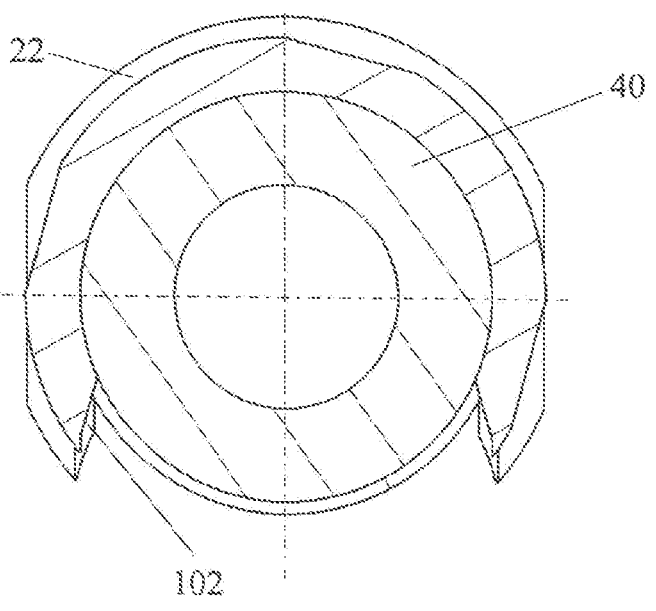

Here, the radial cutout or clearance 102 is designed so that it has a convex shape along the longitudinal axis of the base element 100. This means that a diameter of the cutout or clearance 102 increases starting adjacent to the first outer thread 16 to a maximum and decreases from there towards the second axial end 14. In this way, an undercut is formed in particular adjacent to the first outer thread 16 for the pivoting element 40 in the assembly and disassembly direction, so that the pivoting element 40 is held securely in the base element 100. This can be seen in FIG. 18, which shows a section through the base element 100 in the area of the radial cutout or clearance 102 adjacent to the first outer thread 16. In the area of the maximum diameter of the cutout or clearance 102, as can be seen in FIG. 17, this undercut is preferably not present, which facilitates an assembly and disassembly of the pivoting element 40.

Figure 19:
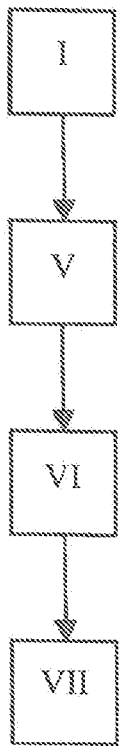

For clarification, the manufacturing method of the base element 100 is explained below with reference to FIG. 19. In a first step I, a providing of a pivoting element 40 and a casting mold for the base element 100 having a shape complementary to the base element 100 takes place. In a subsequent second step V, a material for the base element 100 is cast into the casting mold, wherein the base element 100 has a radial cutout or clearance 102 adjacent to the second axial end. A curing and demolding of the base element 100 takes place in step VI. Finally, in step VII, the pivoting element 40 is clipped into the demolded base element 100. In all other respects, the explanations for the base element 10 apply analogously.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

LIST OF SOME EMBODIMENTS

1. A hollow-cylindrical base element (10) of a connecting unit for connecting a first component (A) to a second component (B) with a distance therebetween, comprising:
   a. an outer side and a threadless inner side (18),
   b. adjacent to a first axial end (12), a first drive feature and a first inner diameter,
   c. adjacent to a second axial end (14) arranged opposite to the first axial end (12), a pivoting element (40) having a threadless passage opening (42) which has a second inner diameter which is smaller than the first inner diameter, and
   d. between the first (12) and the second axial end (14), a first outer thread (16) which, when used in the first component (A), is in engagement therewith, wherein
   e. the pivoting element (40) is in engagement at least partially with the threadless inner side (18) of the hollow-cylindrical base element (10) in such a form-fitting manner that it
   e1. is immovable in the axial direction along a longitudinal axis of the base element (10), and
   e2. is pivotable relative to the longitudinal axis of the base element (10).
2. The hollow-cylindrical base element (10) according to embodiment 1, in which the pivoting element (40) comprises a ball segment section (44) and the base element (10) comprises a connecting section (20) adapted to the ball segment section (44), so that the pivoting element (40) is at least partially in engagement with the threadless inner side (18) of the hollow-cylindrical base element (10) in a form-fitting manner.
3. The hollow-cylindrical base element (10) according to one of the preceding embodiments in which the first outer thread (16) is formed in a self-cutting or self-tapping manner.

4. The hollow-cylindrical base element (10) according to one of the preceding embodiments which comprises a flange at the first axial end (12).
5. The hollow-cylindrical base element (10) according to one of the preceding embodiments, which comprises, adjacent to the second axial end (14), a circumferential groove (22) for the fastening of a securing disc (50).
6. The hollow-cylindrical base element (10) according to one of the preceding embodiments, wherein the base element (10) is made of a first plastic and the pivoting element (40) is made of a second plastic or metal.
7. The hollow-cylindrical base element (10) according to one of the preceding embodiments, in which the pivoting element (40) is pivotable by a solid angle of at least 2°, preferably at least 3° and particularly preferably by at least 4° relative to the longitudinal axis of the base element (10).
8. The hollow-cylindrical base element (10) according to one of the preceding embodiments, in which the pivoting element (40) further comprises a cylindrical section (46) which is arranged at the ball segment section (44) facing away from the first axial end (12).
9. The hollow-cylindrical base element (10) according to one of the preceding embodiments, wherein the pivoting element (40) can be rotated by 360° relative to the base element (10).
10. A first component (A) into which a hollow-cylindrical base element (10) according to one of the embodiments 1 to 9 is screwed.
11. A connecting unit for connecting a first component (A) to a second component (B) with a distance therebetween, comprising:
    a. a hollow-cylindrical base element (10) according to one of embodiments 1 to 9, and
    b. a connecting screw (60) having a head (62), a shaft (64) and a second outer thread (66) provided at the shaft, which is, in use, in engagement with a second inner thread (70) at or adjacent to the second component (B), wherein
    c. the first inner diameter is larger than an outer diameter of the head (62) of the connecting screw (60) and the second inner diameter is larger than an outer diameter of the shaft (64) of the connecting screw (60), so that the head (62) of the connecting screw (60) is arrangeable in the base element (10) and the shaft (64) of the connecting screw (60) extends through the passage opening (42).
12. A connection of a first (A) and a second component (B) in which a base element (10) of a connecting unit according to embodiment 11 is screwed into the first component (A) and the second outer thread (66) of the connecting screw (60) is in engagement with a second inner thread (70) at or adjacent to the second component (B).
13. A manufacturing method of a hollow-cylindrical base element (10) according to one of the embodiments 1 to 9, which comprises the steps:
    a. providing a pivoting element (40) and a casting mold for the base element (10) having a shape complementary to the base element (10), and either
    b1. arranging the pivoting element (40) in the casting mold,
    c1. casting a material for the base element (10) into the casting mold, and
    d1. curing and demolding the base element (10) with the pivoting element (40) at least partially molded therein, or b2. casting a material for the base element (10) into the casting mold, wherein the base element (100) has a radial clearance (102) adjacent to the second axial end, c2. curing and demolding the base element (100) and d2. clipping the pivoting element (40) into the demolded base element (100).

14. The manufacturing method according to embodiment 13, in which the material of the base element (10) is a first plastic and the pivoting element (40) is made of a second plastic or metal.

15. A connecting method of a first component (A) to a second component (B) with a distance therebetween by means of a connecting unit according to embodiment 11, comprising the following steps:

a. screwing the base element (10) of the connecting unit into a first opening in the first component (A), b. inserting the connecting screw (60) into the base element (10) such that the head (62) of the connecting screw (60) is arranged in the base element (10) and the shaft (64) of the connecting screw (60) extends through the passage opening (42); and c. screwing the connecting screw (60) into an inner thread (70) at or adjacent to the second component (B).

16. The connecting method according to embodiment 15, wherein the base element (10) comprises a circumferential groove (22) adjacent to the second axial end (14) and the connecting method comprises the further step:

d. arranging a securing disc (50) in the groove (22) after the step of screwing-in the base element (10) so that the base element (10) is secured against unintentional loosening from the first component (A).

17. The connecting method according to embodiment 15 or 16, which comprises the further step:

e. adjusting a distance between the first (A) and the second component (B) by rotating the base element (10) after the step of screwing-in the connecting screw (60).

The invention claimed is:

1. A hollow-cylindrical base element of a connecting unit for connecting a first component to a second component with a distance therebetween, comprising:

a. an outer side and a threadless inner side, b. adjacent to a first axial end, a first drive feature and a first inner diameter, c. between the first axial end and a second axial end arranged opposite to the first axial end and following a flange at the first axial end, a first outer thread which, when used in the first component, is in engagement therewith, wherein d. a section with the first inner diameter transitions with a step into a connecting section terminating with the second axial end so that the connecting section is present between the step and the second axial end, and the hollow-cylindrical base element further comprises:

e. a pivoting element comprising a ball segment section as well as a cylindrical section and having a threadless passage opening which has a second inner diameter which is smaller than the first inner diameter, wherein the cylindrical section is arranged at the ball segment section facing away from the first axial end such that, when in use, the cylindrical section provides an abutment face for the second component, wherein, f. the pivoting element is provided adjacent to the second axial and the connecting section is adapted to the ball segment section so that the pivoting element is in engagement at least partially with the threadless inner side of the hollow-cylindrical base element in the area of the connecting section and in such a form-fitting manner that it f1. is immovable in either axial direction along a longitudinal axis of the base element so that the pivoting element cannot be released from the base element without destroying the base element, f2. is non-detachably connected to the base element along the longitudinal axis, and f3. is pivotable relative to the longitudinal axis of the base element, and g1. the pivoting element is circumferentially completely surrounded by the base element or g2. the base element comprises a radial cutout or clearance adjacent to the second axial end which is dimensioned such that the pivoting element can be clipped in laterally relative to the longitudinal axis of the base element.

2. The hollow-cylindrical base element according to claim 1 in which the first outer thread is formed in a self-cutting or self-tapping manner.

3. The hollow-cylindrical base element according to claim 1, which comprises, adjacent to the second axial end, a circumferential groove for the fastening of a securing disc.

4. The hollow-cylindrical base element according to claim 1, wherein the base element is made of a first plastic and the pivoting element is made of a second plastic or metal.

5. The hollow-cylindrical base element according to claim 1, in which the pivoting element is pivotable by a solid angle of at least 2° relative to the longitudinal axis of the base element.

6. The hollow-cylindrical base element according to claim 1, wherein the pivoting element can be rotated by 360° relative to the base element.

7. A connection of a first and a second component with a distance therebetween, wherein a hollow-cylindrical base element according to claim 1 is screwed into the first component and a second outer thread of a connecting screw is in engagement with a second inner thread at or adjacent to the second component, wherein the connecting screw has a head and a shaft and the second outer thread is provided at the shaft, which is, in use, in engagement with the second inner thread at or adjacent to the second component, wherein the first inner diameter of the base element is larger than an outer diameter of the head of the connecting screw and the second inner diameter of the passage opening of the pivoting element is larger than an outer diameter of the shaft of the connecting screw, so that the head of the connecting screw is arrangeable in the base element and the shaft of the connecting screw extends through the passage opening.

* * * * *